US011535179B2

(12) United States Patent
Nakahara et al.

(10) Patent No.: US 11,535,179 B2
(45) Date of Patent: Dec. 27, 2022

(54) VEHICLE COMMUNICATION SYSTEM

(71) Applicant: Yazaki Corporation, Tokyo (JP)

(72) Inventors: Takahiro Nakahara, Shizuoka (JP);
Takayuki Ueda, Shizuoka (JP); You
Yanagida, Shizuoka (JP)

(73) Assignee: YAZAKI CORPORATION, Tokyo
(JP)

( * ) Notice: Subject to any disclaimer, the term of this
patent is extended or adjusted under 35
U.S.C. 154(b) by 517 days.

(21) Appl. No.: 16/785,722

(22) Filed: Feb. 10, 2020

(65) Prior Publication Data
US 2020/0290532 A1 Sep. 17, 2020

(30) Foreign Application Priority Data

Mar. 15, 2019 (JP) ............... JP2019-048615

(51) Int. Cl.
*B60R 16/023* (2006.01)
*G06F 21/52* (2013.01)
*G06F 21/60* (2013.01)

(52) U.S. Cl.
CPC .......... *B60R 16/0231* (2013.01); *G06F 21/52*
(2013.01); *G06F 21/606* (2013.01)

(58) Field of Classification Search
CPC ... B60R 16/0231; G06F 21/52; G06F 21/606;
G06F 11/0739; G06F 11/0751; G06F
11/0772; G06F 11/1428; G06F 11/2005;
G06F 11/2035; G06F 11/2048; G06F
11/07; G06F 11/20; G05B 19/0428; G05B
2219/2637; H04L 12/4641; H04L
2012/40273; H04L 2209/84; H04L 67/12;
H04L 41/0663
See application file for complete search history.

(56) References Cited

U.S. PATENT DOCUMENTS

2014/0297109 A1* 10/2014 Shimomura .......... H04L 67/125
701/36
2020/0036554 A1 1/2020 Iwata et al.

FOREIGN PATENT DOCUMENTS

JP 2017-118407 A 6/2017
WO 2018061362 A1 4/2018

* cited by examiner

*Primary Examiner* — Jacob M Amick
*Assistant Examiner* — Charles J Brauch
(74) *Attorney, Agent, or Firm* — Sughrue Mion, PLLC

(57) ABSTRACT

A vehicle communication system includes a switching hub incorporated in a vehicle and including a switch IC and an external CPU. The switch IC includes an internal CPU and performs a transfer process of transferring information to a communication device. The external CPU is provided outside the switch IC and connected to the switch IC, and has higher information processing capability than the internal CPU. The external CPU can perform a transfer order process of ordering to transfer information to the communication device and perform a security process of securing the security of the information to be transferred when the transfer order process is performed. The internal CPU monitors the operation of the external CPU and when the external CPU is abnormal, performs the transfer order process instead of the external CPU.

3 Claims, 8 Drawing Sheets

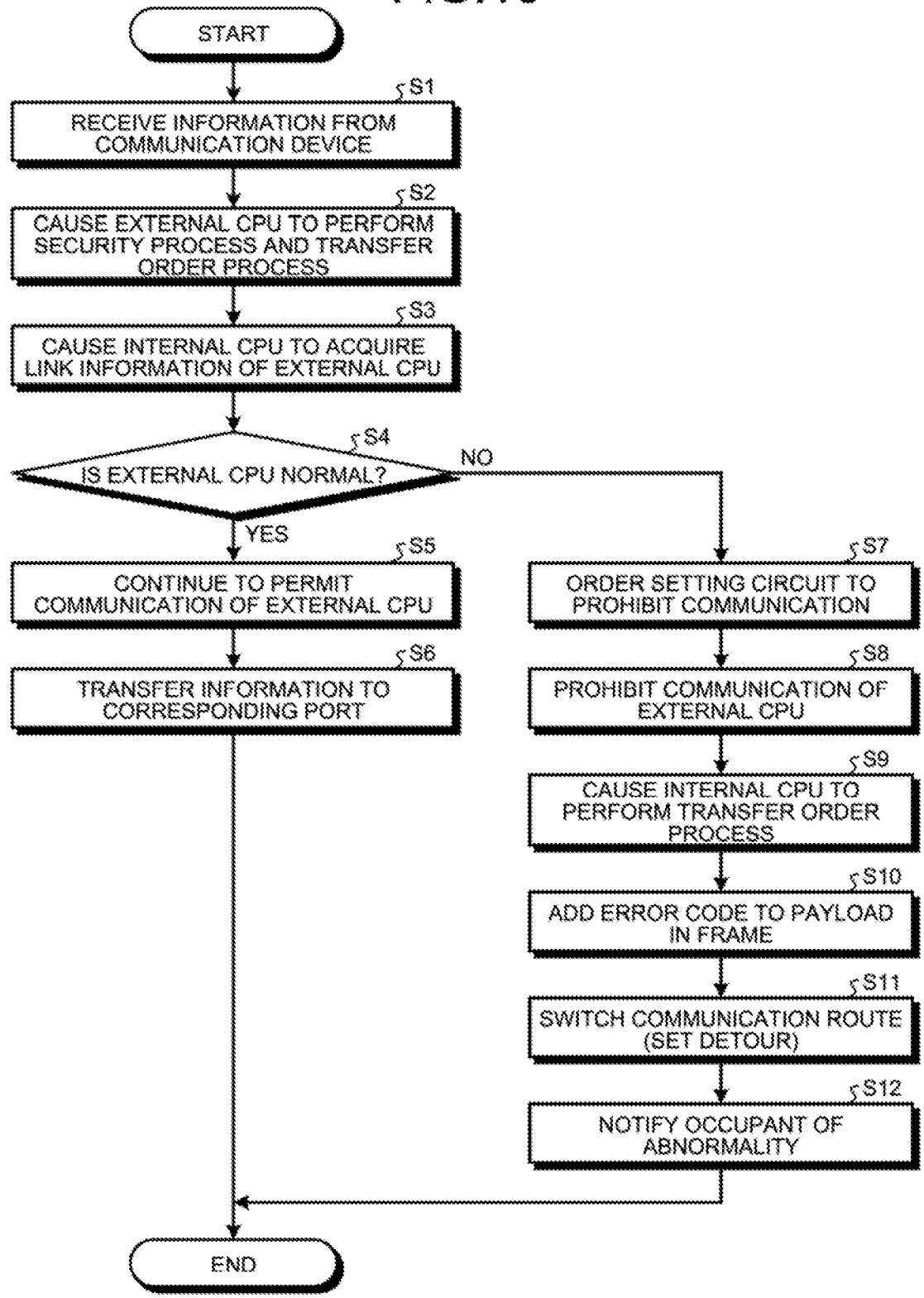

VEHICLE COMMUNICATION SYSTEM

CROSS-REFERENCE TO RELATED APPLICATION(S)

The present application claims priority to and incorporates by reference the entire contents of Japanese Patent Application No. 2019-048615 filed in Japan on Mar. 15, 2019.

BACKGROUND OF THE INVENTION

1. Field of the Invention

The present invention relates to a vehicle communication system.

2. Description of the Related Art

One example of the conventional vehicle communication systems is a communication system disclosed in Japanese Patent Application Laid-open No. 2017-118407. This communication system includes a relay device incorporated in a vehicle to relay data between a high-speed communication line and a low-speed communication line in the vehicle. This relay device includes a table containing information for relaying data, and a CPU relaying the data on the basis of the table.

The communication system according to Japanese Patent Application Laid-open No. 2017-118407 has been desired to be able to continue the relay of the data even in the occurrence of an abnormality in the CPU in the relay device, for example.

SUMMARY OF THE INVENTION

The present invention has been made in view of the above circumstance, and has an object to provide a vehicle communication system that can transfer information properly.

In order to achieve the above mentioned object, a vehicle communication system according to one aspect of the present invention includes a transfer unit including a control circuit that includes an internal controller, is incorporated in a vehicle, is connected to a device, and performs a transfer process of transferring information to the device, and an external controller that is provided outside the control circuit, is connected to the control circuit, has higher information processing capability than the internal controller, is able to perform a transfer order process of ordering to perform the transfer process, and when performing the transfer order process, is able to perform a security process of securing security of the information to be transferred, wherein the internal controller monitors operation of the external controller, and when the external controller is abnormal, the internal controller performs the transfer order process instead of the external controller.

According to another aspect of the present invention, in the vehicle communication system, it is preferable that when the external controller is abnormal, the internal controller disables a function of the external controller, performs the transfer order process instead of the external controller, and does not perform the security process.

According to still another aspect of the present invention, in the vehicle communication system, it is possible to further include a plurality of the transfer units, wherein the transfer units include a first transfer unit and a second transfer unit that transfers information transmitted from the first transfer unit, when the external controller of the first transfer unit is normal, the first transfer unit transmits, to the second transfer unit, security secured information for which the external controller of the first transfer unit has performed the security process so that the security is secured, and the second transfer unit transfers the security secured information transmitted from the first transfer unit without performing the security process, and when the external controller of the first transfer unit is abnormal, the first transfer unit transmits, to the second transfer unit, security unsecured information for which the security process has not been performed, and the second transfer unit causes the external controller of the second transfer unit to perform the security process for the security unsecured information transmitted from the first transfer unit and transfers the information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a flowchart illustrating an operation example of the vehicle communication system according to one embodiment.

DETAILED DESCRIPTION OF THE PREFERRED EMBODIMENTS

A mode for carrying out the present invention (embodiment) is described in detail with reference to the drawings. The present invention is not limited by the content described in the embodiment below. The component described below includes the component that can be easily conceived by a person skilled in the art or that is substantially the same. Furthermore, the structures described below can be combined as appropriate. In addition, the structures can be variously omitted, replaced, and changed within the range not departing from the concept of the present invention.

Embodiment

Figure 1:
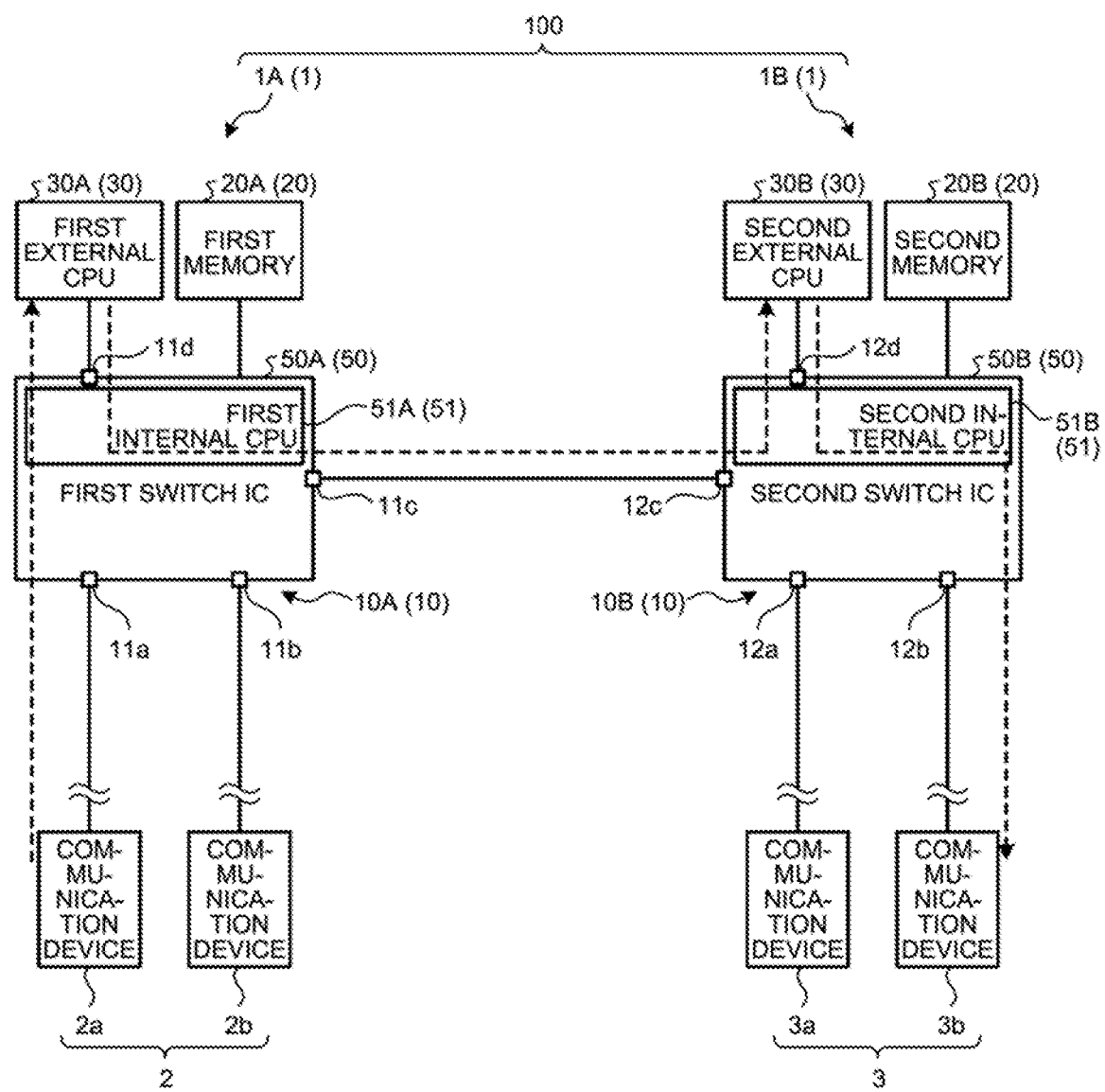
FIG. 1 is a block diagram illustrating a structure example and an operation example of a vehicle communication system according to one embodiment.
Figure 2:
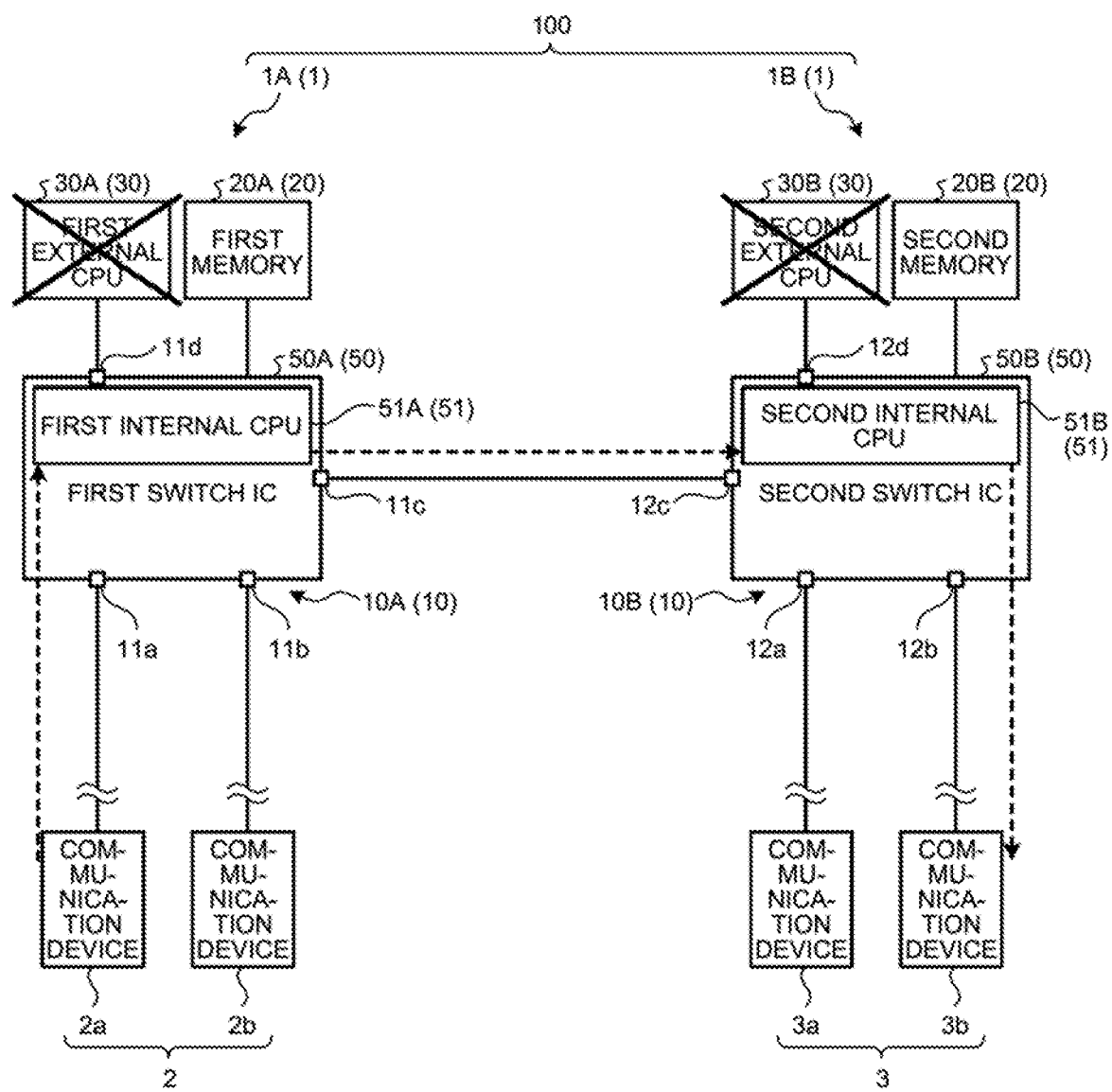
FIG. 2 is a block diagram illustrating the operation example of the vehicle communication system according to one embodiment.
Figure 3:
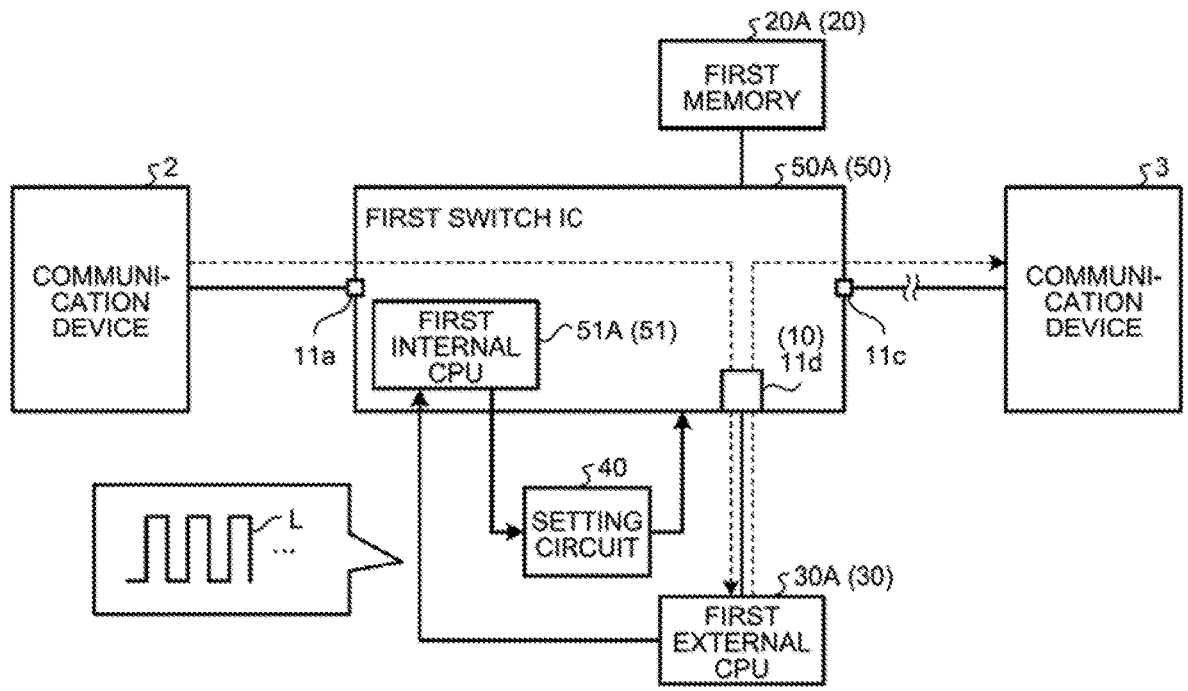
FIG. 3 is a block diagram illustrating a structure example and an operation example of a switching hub according to one embodiment.
Figure 4:
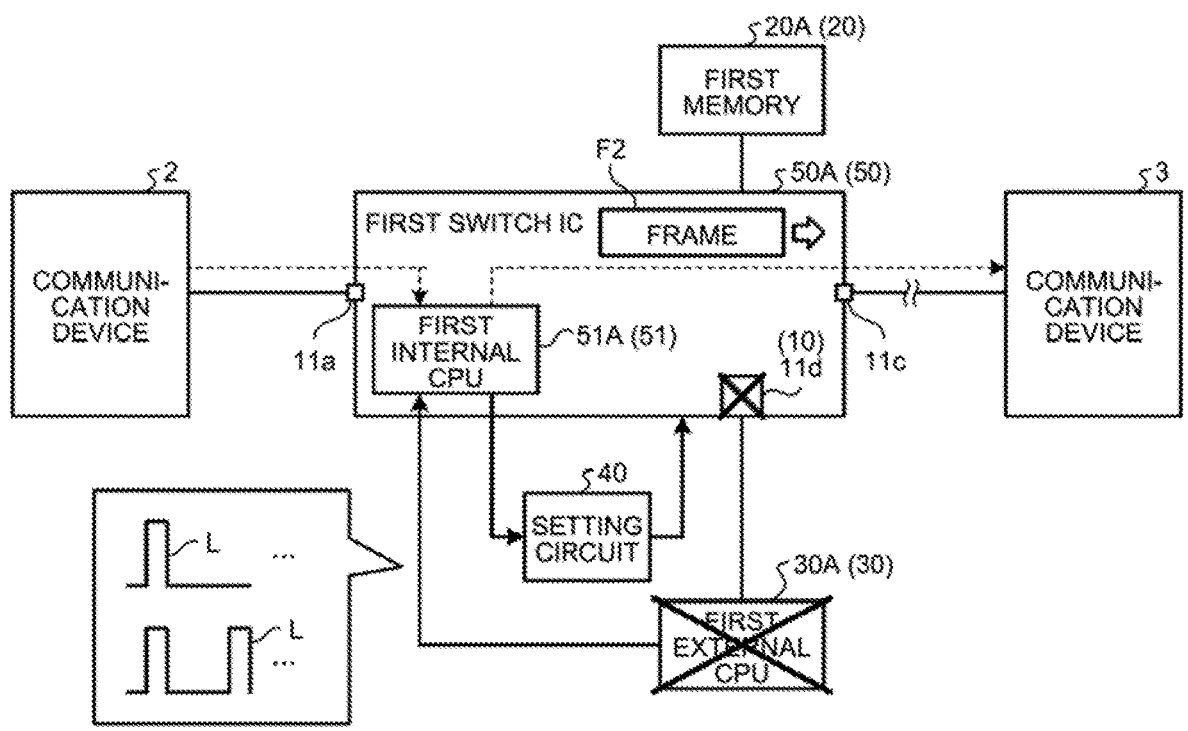
FIG. 4 is a block diagram illustrating an operation example of the switching hub according to one embodiment.
Figure 5:
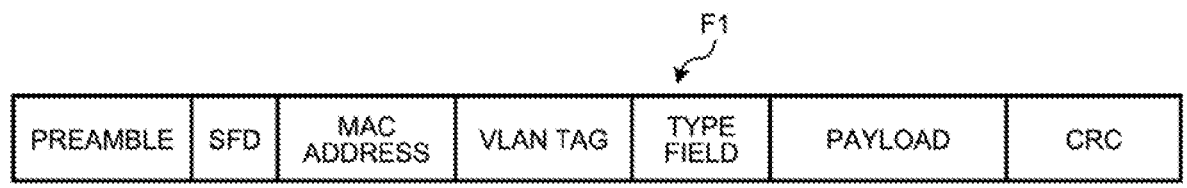
FIG. 5 is a diagram illustrating a structure example of a frame according to one embodiment.
Figure 6:
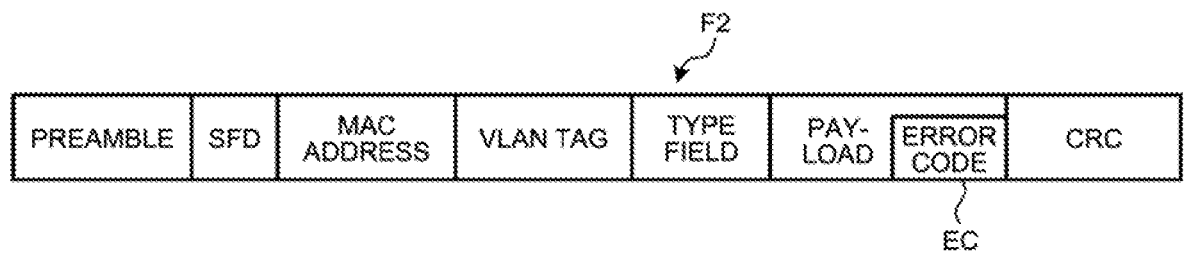
FIG. 6 is a diagram illustrating a structure example of a frame when an error code is added according to one embodiment.

A vehicle communication system 100 according to one embodiment is described with reference to the drawings. FIG. 1 is a block diagram illustrating a structure example and an operation example of the vehicle communication system 100 according to one embodiment. FIG. 2 is a block diagram illustrating the operation example of the vehicle communication system 100 according to one embodiment. FIG. 3 is a block diagram illustrating a structure example and an operation example of a switching hub 1 according to one embodiment. FIG. 4 is a block diagram illustrating an operation example of the switching hub 1 according to one embodiment. FIG. 5 is a diagram illustrating a structure example of a frame F1 according to one embodiment. FIG. 6 is a diagram illustrating a structure example of a frame F2 when an error code is added according to one embodiment.

The vehicle communication system 100 is a system that is incorporated in a vehicle and connects a plurality of communication devices 2 and 3 provided to the vehicle so that communication is possible therebetween. The vehicle communication system 100 includes a plurality of switching hubs 1 as a plurality of transfer units. Each switching hub 1 is used to connect the communication devices 2 and 3 and transfer information to the communication devices 2 and 3. Each switching hub 1 forms an in-vehicle LAN (Local Area Network) corresponding to a communication network provided to the vehicle. The in-vehicle LAN may employ, for example, the communication standard of Ethernet (registered trademark) but the communication standard is not limited thereto.

As illustrated in FIG. 1 to FIG. 4, each switching hub 1 includes an input-output I/F 10, a memory 20, a switch IC 50 serving as a control circuit, an external CPU 30, and a setting circuit 40 (see FIG. 3, etc.). The switching hubs 1 include a first switching hub 1A and a second switching hub 1B. The first switching hub 1A includes a first input-output I/F 10A, a first memory 20A, a first external CPU 30A, and the setting circuit 40, and a first switch IC 50A.

The first input-output I/F 10A is an interface to be connected to each device. The first input-output I/F 10A is provided to the first switch IC 50A and also connected to the communication devices 2 and the like through communication lines. The first input-output I/F 10A includes ports 11a to 11d. The ports 11a and 11b are connected to communication devices 2a and 2b, respectively, through communication lines. The port 11c is connected to the second switching hub 1B through a communication line. The port 11d is connected to the first external CPU 30A through a communication line.

The first memory 20A stores information therein. The first memory 20A is, for example, a nonvolatile memory and is formed by a magnetic storage device, an optical disk, a flash memory, or the like. The first memory 20A is provided outside the first switch IC 50A, and is connected to the first switch IC 50A through a communication line. The first memory 20A stores computer programs and information therein to cause the first external CPU 30A and the first switch IC 50A to operate. The first memory 20A stores therein, for example, a computer program for a normal mode and a routing table for a normal mode, which are applied when the first external CPU 30A is normal, and a computer program for a safe mode and a routing table for a safe mode, which are applied when the first external CPU 30A is abnormal.

Each routing table is used when the information is transferred. In the routing table, the MAC address of each communication device 2 or the like and the port number of the first input-output I/F 10A are associated with each other. For example, the MAC address of the communication device 2a and the port number of the port 11a are associated with each other, the MAC address of the communication device 2b and the port number of the port 11b are associated with each other, the MAC address of the second switching hub 1B and the port number of the port 11c are associated with each other, and the MAC address of the first external CPU 30A and the port number of the port 11d are associated with each other.

The first external CPU 30A is to perform a transfer order process and a security process. The first external CPU 30A is, for example, an electronic component in which elements such as a transistor, a resistor, and a capacitor are formed on a substrate different from a substrate of the first switch IC 50A. The first external CPU 30A is provided outside the first switch IC 50A and connected to the switch IC 50 through a communication line. That is to say, the first external CPU 30A is externally attached to the first switch IC 50A. The first external CPU 30A has higher information processing capability than a first internal CPU 51A, which is described below. That is to say, the first external CPU 30A has higher capability of calculating information than the first internal CPU 51A. It is preferable that the first external CPU 30A has the higher clock frequency than the first internal CPU 51A for operating the CPU, includes more CPU cores than the first internal CPU 51A, and has higher capacity in cache memory than the first internal CPU 51A.

The first external CPU 30A performs the transfer order process of ordering to perform a transfer process of transferring information to each device. The first external CPU 30A performs the transfer order process of ordering to transfer information to each device on the basis of the routing table for the normal mode that is stored in the first memory 20A, for example. The first external CPU 30A refers to the normal routing when the frame F1 (see FIG. 5) of Ethernet is output from the communication device 2, for example. Here, the frame F1 includes fields of preamble, SFD, MAC address, VLAN tag, type field, payload, CRC, and the like as publicly known (see FIG. 5). The first external CPU 30A compares the MAC address included in the frame F1 in Ethernet and the MAC address of each device registered in the routing table for the normal mode. Then, the first external CPU 30A detects the MAC address of each device that coincides with the MAC address in the frame F1, and acquires the port number associated with the MAC address of the detected device. Next, the first external CPU 30A outputs to the first internal CPU 51A, a transfer order signal for ordering to transfer the frame F1 of Ethernet to any of the ports 11a to 11c that is indicated by the acquired port number.

The first external CPU 30A further performs a security process of securing the security of the information to be transferred when the transfer order process is performed. The first external CPU 30A performs the security process by discarding the frame F1 that is suspicious. Specifically, the first external CPU 30A compares the MAC address of the frame F1 to be transferred and the MAC address that is predetermined as an allowable MAC address, and if the MAC address of the frame F1 to be transferred does not coincide with the allowable MAC address, the first external CPU 30A determines that the frame F1 to be transferred is the suspicious frame F1 and discards the suspicious frame F1. On the other hand, if the MAC address of the frame F1 to be transferred coincides with the allowable MAC address, the first external CPU 30A determines that the frame F1 to be transferred is the frame F1 that is reliable and does not discard the frame F1.

The first external CPU 30A outputs link information L for operation checking (see FIG. 3, etc.) to the first internal CPU 51A. For example, the first external CPU 30A outputs one pulse signal for one main process of the first external CPU 30A to the first internal CPU 51A as the link information L. If the first external CPU 30A is normal, the first external CPU 30A outputs the pulse signal with a fixed cycle to the first internal CPU 51A as the link information L (see FIG. 3). On the other hand, if the first external CPU 30A is abnormal, the first external CPU 30A outputs the pulse signal with an unfixed cycle or a signal with intermittent pulses to the first internal CPU 51A as the link information L (see FIG. 4).

The setting circuit 40 is to permit or prohibit the communication of the input-output I/F 10 (port 11d). The setting circuit 40 is connected to the first internal CPU 51A and the port 11d, and controls the port 11d on the basis of the order output from the first internal CPU 51A. If the first internal CPU 51A has output the order to prohibit the communication performed by the first external CPU 30A, the setting circuit 40 prohibits the communication of the port 11d. On the other hand, if the first internal CPU 51A has not output the order to prohibit the communication performed by the first external CPU 30A, the setting circuit 40 continues to permit the communication of the port 11d.

The first switch IC 50A is connected to each device and performs the transfer process of transferring information to the connected device. The first switch IC 50A is an electronic component having elements such as a transistor, a resistor, and a capacitor formed on a substrate. The first switch IC 50A includes the first internal CPU 51A. The first internal CPU 51A is mounted on the substrate of the first switch IC 50A, and is incorporated in the first switch IC 50A. The first internal CPU 51A is connected to the first memory 20A and the setting circuit 40, and moreover connected to the first external CPU 30A, the communication devices 2, and the second switching hub 1B through the first input-output I/F 10A.

The first internal CPU 51A performs the transfer process of transferring information to each device. If the first external CPU 30A is normal, the first internal CPU 51A operates based on the computer program for the normal mode stored in the first memory 20A. The first internal CPU 51A outputs the information to be transferred to each of the ports 11a to 11d on the basis of the transfer order signal output from the first external CPU 30A, for example. If the transfer order signal expresses that the information to be transferred is output to the port 11a, for example, the first internal CPU 51A outputs the information to be transferred to the port 11a, and if the transfer order signal expresses that the information to be transferred is output to the port 11b, the first internal CPU 51A outputs the information to be transferred to the port 11b. Note that the control of outputting the information to be transferred to the ports 11a to 11d may be performed by a CPU other than the first internal CPU 51A.

The first internal CPU 51A further monitors the operation of the first external CPU 30A. As illustrated in FIG. 3, for example, the first internal CPU 51A monitors the operation of the first external CPU 30A on the basis of the link information L output from the first external CPU 30A. The first internal CPU 51A determines whether the first external CPU 30A is normal or abnormal on the basis of the link information L output from the first external CPU 30A. For example, if the link information L is the pulse signal with the fixed cycle, the first internal CPU 51A determines that the first external CPU 30A is normal. On the other hand, if the link information L expresses the pulse signal with the unfixed cycle or the signal with intermittent pulses, the first internal CPU 51A determines that the first external CPU 30A is abnormal.

If the first external CPU 30A is abnormal, the first internal CPU 51A operates on the basis of the computer program for the safe mode and the routing table for the safe mode that are stored in the first memory 20A. In this case, the first internal CPU 51A disables the function of the first external CPU 30A. The first internal CPU 51A, for example, outputs to the setting circuit 40, the order to prohibit the communication performed by the first external CPU 30A. Then, the first internal CPU 51A performs the transfer order process instead of the first external CPU 30A. The first internal CPU 51A performs the transfer order process of ordering to transfer information to each communication device 2 and the like on the basis of the routing table for the safe mode, for example. The first internal CPU 51A outputs the information to be transferred to each of the ports 11a to 11d on the basis of the transfer order that is determined by itself in the transfer order process. Here, since the information processing capability is insufficient, the first internal CPU 51A does not perform the security process of discarding the suspicious frame F1.

Next, the second switching hub 1B is described. The second switching hub 1B is configured similarly to the first switching hub 1A described above. In the following description of the second switching hub 1B, the structure similar to that of the first switching hub 1A is omitted as much as possible. The second switching hub 1B includes a second input-output I/F 10B, a second memory 20B, a second switch IC 50B, the setting circuit 40, and a second external CPU 30B.

The second input-output I/F 10B is an interface to be connected to each device. The second input-output I/F 10B includes ports 12a to 12d.

The second memory 20B stores information therein. The second memory 20B is provided outside the second switch IC 50B and connected to the second switch IC 50B through a communication line. The second memory 20B stores computer programs and information therein to cause the second external CPU 30B and the second switch IC 50B to operate. The second memory 20B stores therein, for example, a computer program for a normal mode and a routing table for a normal mode, which are applied when the second external CPU 30B is normal, and a computer program for a safe mode and a routing table for a safe mode, which are applied when the second external CPU 30B is abnormal.

The second external CPU 30B is to perform the transfer order process and the security process. The second external CPU 30B is provided outside the second switch IC 50B and connected to the second switch IC 50B through a communication line. The second external CPU 30B has higher information processing capability than a second internal CPU 51B, which is described below.

The second external CPU 30B performs the transfer order process of ordering to transfer the information to the communication devices 3. The second external CPU 30B performs the transfer order process of ordering to transfer information to each device on the basis of the routing table for the normal mode that is stored in the second memory 20B. The second external CPU 30B further performs the security process of securing the security of the information to be transferred when the transfer order process is performed. The second external CPU 30B performs the security process by discarding the frame F1 that is suspicious. The second external CPU 30B outputs the link information L for the operation checking to the second internal CPU 51B.

The second switch IC 50B is connected to each device and performs the transfer process of transferring the information to the connected device. The second switch IC 50B is an electronic component having elements such as a transistor, a resistor, and a capacitor formed on a substrate. The second switch IC 50B includes the second internal CPU 51B. The second internal CPU 51B is mounted on the substrate of the second switch IC 50B, and is incorporated in the second switch IC 50B. The second internal CPU 51B is connected to the second memory 20B and the setting circuit 40, and moreover connected to the second external CPU 30B, the communication devices 3, and the first switching hub 1A through the second input-output I/F 10B.

The second internal CPU 51B performs the transfer process of transferring information to each device. If the second external CPU 30B is normal, the second internal CPU 51B operates based on the computer program for the normal mode stored in the second memory 20B. The second internal CPU 51B outputs the information to be transferred to each of the ports 12a to 12d on the basis of the transfer order signal output from the second external CPU 30B, for example. Note that the control of outputting the information to be transferred to each of the ports 12a to 12d may be performed by a CPU other than the second internal CPU 51B.

The second internal CPU 51B further monitors the operation of the external CPU 30. For example, the second internal CPU 51B monitors the operation of the second external CPU 30B on the basis of the link information L output from the second external CPU 30B, and determines whether the second external CPU 30B is normal or abnormal.

If the second external CPU 30B is abnormal, the second internal CPU 51B operates on the basis of the computer program for the safe mode and the routing table for the safe mode that are stored in the second memory 20B. In this case, the second internal CPU 51B disables the function of the second external CPU 30B. Then, the second internal CPU 51B performs the transfer order process instead of the second external CPU 30B. The second internal CPU 51B performs the transfer order process of ordering to transfer information to each device on the basis of the routing table for the safe mode, for example. The second internal CPU 51B outputs the information to be transferred to each of the ports 12a to 12d on the basis of the transfer order that is determined by itself in the transfer order process. Here, since the information processing capability is insufficient, the second internal CPU 51B does not perform the security process of discarding the suspicious frame F1 described above.

Figure 7:
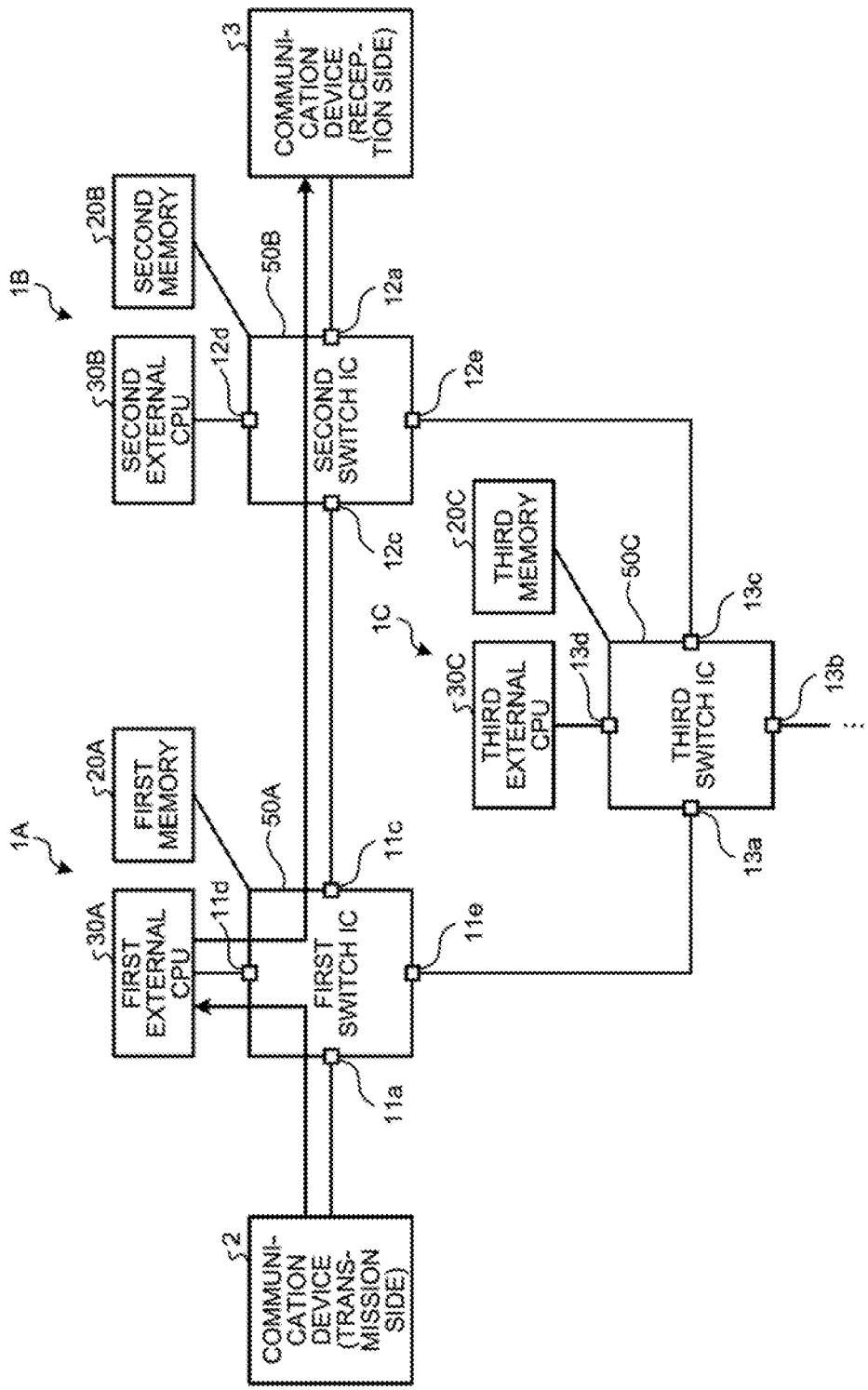
FIG. 7 is a block diagram illustrating an operation example in which the vehicle communication system according to one embodiment is normal.

Next, an operation example in which the vehicle communication system 100 is normal is described. FIG. 7 is a block diagram illustrating an operation example in which the vehicle communication system 100 according to one embodiment is normal. In this example, the vehicle communication system 100 includes a third switching hub 1C in addition to the first switching hub 1A and the second switching hub 1B. The third switching hub 1C includes the input-output I/F 10, a third memory 20C, a third external CPU 30C, the setting circuit 40, and a third switch IC 50C. The input-output I/F 10 includes ports 13a to 13d. The third switching hub 1C has the third switch IC 50C connected to the third external CPU 30C through the port 13d, the third switch IC 50C connected to the first switching hub 1A through the port 13a, and the third switch IC 50C connected to the second switching hub 1B through the port 13c.

If the first external CPU 30A is normal, for example, the first external CPU 30A performs the security process as illustrated in FIG. 7. For example, the first external CPU 30A compares the MAC address of the frame F1 output from the communication device 2 and the MAC address that is predetermined as an allowable MAC address, and if the MAC address of the frame F1 to be transferred does not coincide with the allowable MAC address, the first external CPU 30A determines that the frame F1 to be transferred is the suspicious frame F1 and discards the suspicious frame F1. On the other hand, if the MAC address of the frame F1 to be transferred coincides with the allowable MAC address, the first external CPU 30A determines that the frame F1 to be transferred is the frame that is reliable and does not discard the frame F1.

If the frame F1 is reliable, the first external CPU 30A performs the transfer order process of ordering to transfer the frame F1 output from the communication device 2 on the basis of the routing table for the normal mode that is stored in the first memory 20A. The first external CPU 30A, for example, compares the MAC address included in the frame F1 and the MAC address of each device registered in the routing table for the normal mode. Then, the first external CPU 30A detects the MAC address of the second switching hub 1B that coincides with the MAC address in the frame F1, and acquires the port number associated with the MAC address of the detected second switching hub 1B. Next, the first external CPU 30A outputs to the first internal CPU 51A, a transfer order signal for ordering to transfer the frame F1 to the port 11c indicated by the acquired port number. If the transfer order signal expresses that the information to be transferred is output to the port 11c, the first internal CPU 51A outputs the frame F1 to be transferred to the port 11c and transfers the frame F1 to the second switching hub 1B (see FIG. 7).

If the frame F1 is output from the first internal CPU 51A, the second external CPU 30B of the second switching hub 1B compares the MAC address in the frame F1 and the MAC address of each device registered in the routing table for the normal mode. Then, the second external CPU 30B detects the MAC address of the communication device 3 that coincides with the MAC address in the frame F1 and acquires the port number that is associated with the MAC address of the detected communication device 3. Then, the second external CPU 30B outputs to the second internal CPU 51B, the transfer order signal for ordering to transfer the frame F1 to the port 12a that is indicated by the acquired port number. If the transfer order signal expresses that the frame F1 to be transferred is output to the port 12a, the second internal CPU 51B outputs the frame F1 to be transferred to the port 12a (see FIG. 7). Note that since the security process is already performed by the first external CPU 30A, the second external CPU 30B does not need to perform the security process; however, the structure is not limited thereto. To achieve the double fail safe, the vehicle communication system 100 performs the security process also in the second external CPU 30B.

Figure 8:
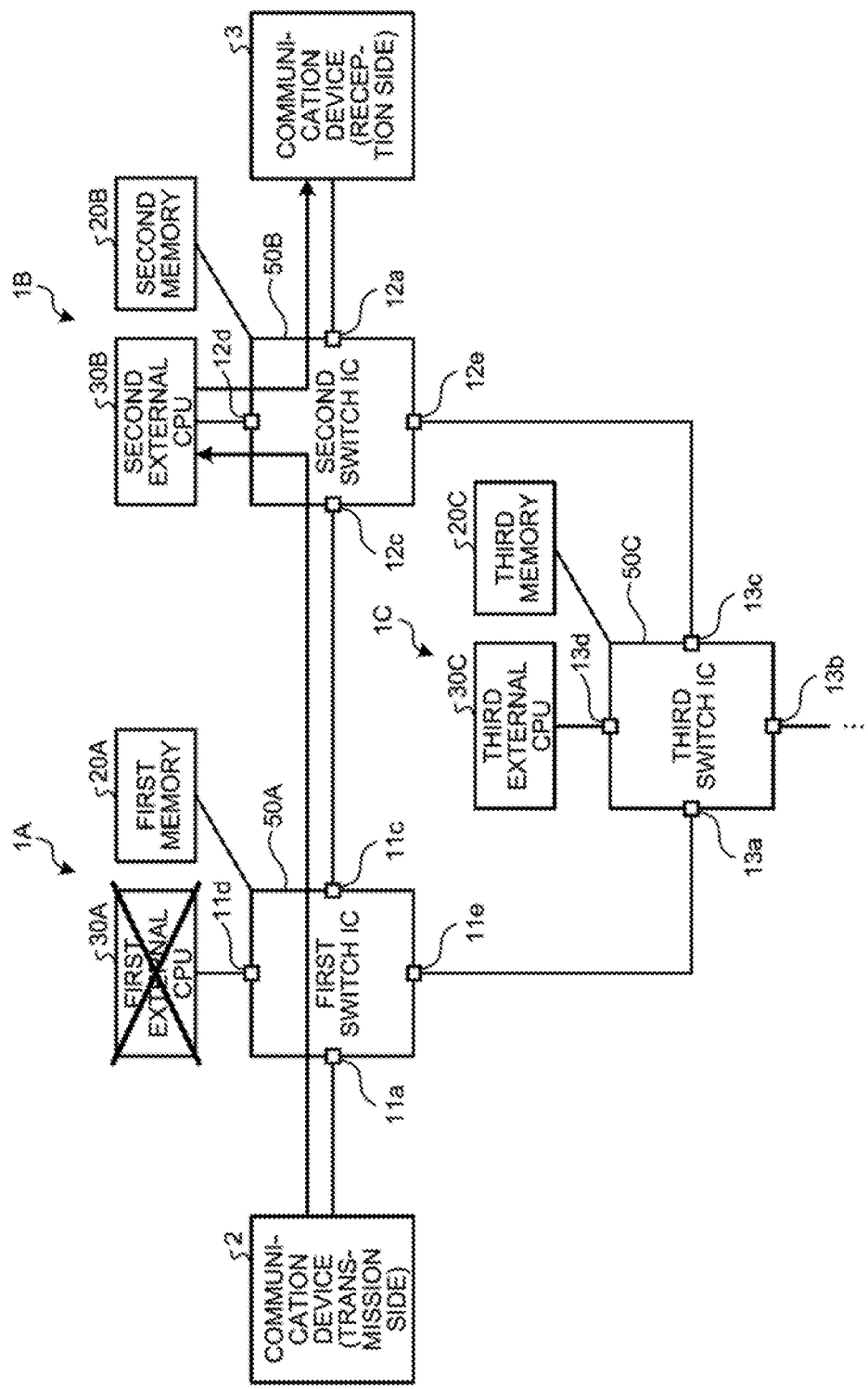
FIG. 8 is a block diagram illustrating an operation example in which the vehicle communication system according to one embodiment is abnormal (No. 1)

Next, an operation example in which the vehicle communication system 100 is abnormal is described. FIG. 8 is a block diagram illustrating an operation example in which the vehicle communication system 100 according to one embodiment is abnormal (No. 1). In the example described here, as illustrated in FIG. 8, the first external CPU 30A is abnormal in the vehicle communication system 100. In this case, the first internal CPU 51A of the first switch IC 50A outputs to the setting circuit 40, the order to prohibit the communication performed by the first external CPU 30A. If the first internal CPU 51A has output the order to prohibit the communication performed by the first external CPU 30A, the setting circuit 40 prohibits the communication of the port 11d.

After the communication of the port 11d is prohibited, the first internal CPU 51A performs the transfer order process instead of the first external CPU 30A. The first internal CPU 51A, for example, performs the transfer order process of ordering to transfer information to each device on the basis of the routing table for the safe mode. For example, if the frame F1 is output from the communication device 2, the first internal CPU 51A refers to the routing table for the safe mode. Then, the first internal CPU 51A compares the MAC address included in the frame F1 and the MAC address of each device registered in the routing table for the safe mode. Next, the first external CPU 30A detects the MAC address of the second switching hub 1B that coincides with the MAC address in the frame F1, and acquires the port number associated with the MAC address of the detected second switching hub 1B. Here, the first internal CPU 51A generates a frame F2 (see FIG. 6) in which an error code EC expressing that the first external CPU 30A is abnormal and operates in the safe mode is added to the field in the payload in the frame F1. The first internal CPU 51A performs the transfer order process of ordering to transfer the frame F2 to the port 11c indicated by the acquired port number. The first internal CPU 51A outputs the frame F2 to be transferred to the port 11c on the basis of the transfer order that is determined by itself in the transfer order process, and transfers the frame F2 to the second switching hub 1B. In this case, the first internal CPU 51A does not perform the security process because the information processing capability is insufficient.

Since the error code EC is added to the field in the payload in the frame F2, the second external CPU 30B of the second switching hub 1B operates based on the computer program for the safe mode and the routing table for the safe mode. Since the security process is not performed in the source of the frame F2 (the first switching hub 1A), the second external CPU 30B performs the security process instead. For example, the second external CPU 30B compares the MAC address of the frame F2 output from the first switching hub 1A and the MAC address that is predetermined as an allowable MAC address, and if the MAC address of the frame F2 to be transferred does not coincide with the allowable MAC address, the second external CPU 30B determines that the frame F2 to be transferred is the suspicious frame F2 and discards the suspicious frame F2. On the other hand, if the MAC address of the frame F2 to be transferred coincides with the allowable MAC address, the second external CPU 30B determines that the frame F2 to be transferred is the frame F2 that is reliable and does not discard the frame F2.

If the frame F2 is a reliable frame, the second external CPU 30B performs the transfer order process of ordering to transfer the frame F2 output from the first switching hub 1A on the basis of the routing table for safe mode. The second external CPU 30B, for example, compares the MAC address included in the frame F2 and the MAC address of each device registered in the routing table for the safe mode. Then, the second external CPU 30B detects the MAC address of the communication device 3 that coincides with the MAC address in the frame F2, and acquires the port number associated with the MAC address of the detected communication device 3. Next, the second external CPU 30B outputs to the second internal CPU 51B, the transfer order signal for ordering to transfer the frame F2 to the port 12a indicated by the acquired port number. If the transfer order signal expresses that the information to be transferred is output to the port 12a, the second internal CPU 51B outputs the frame F2 to be transferred to the port 12a and transfers the frame F2 to the communication device 3 (see FIG. 8).

Figure 9:
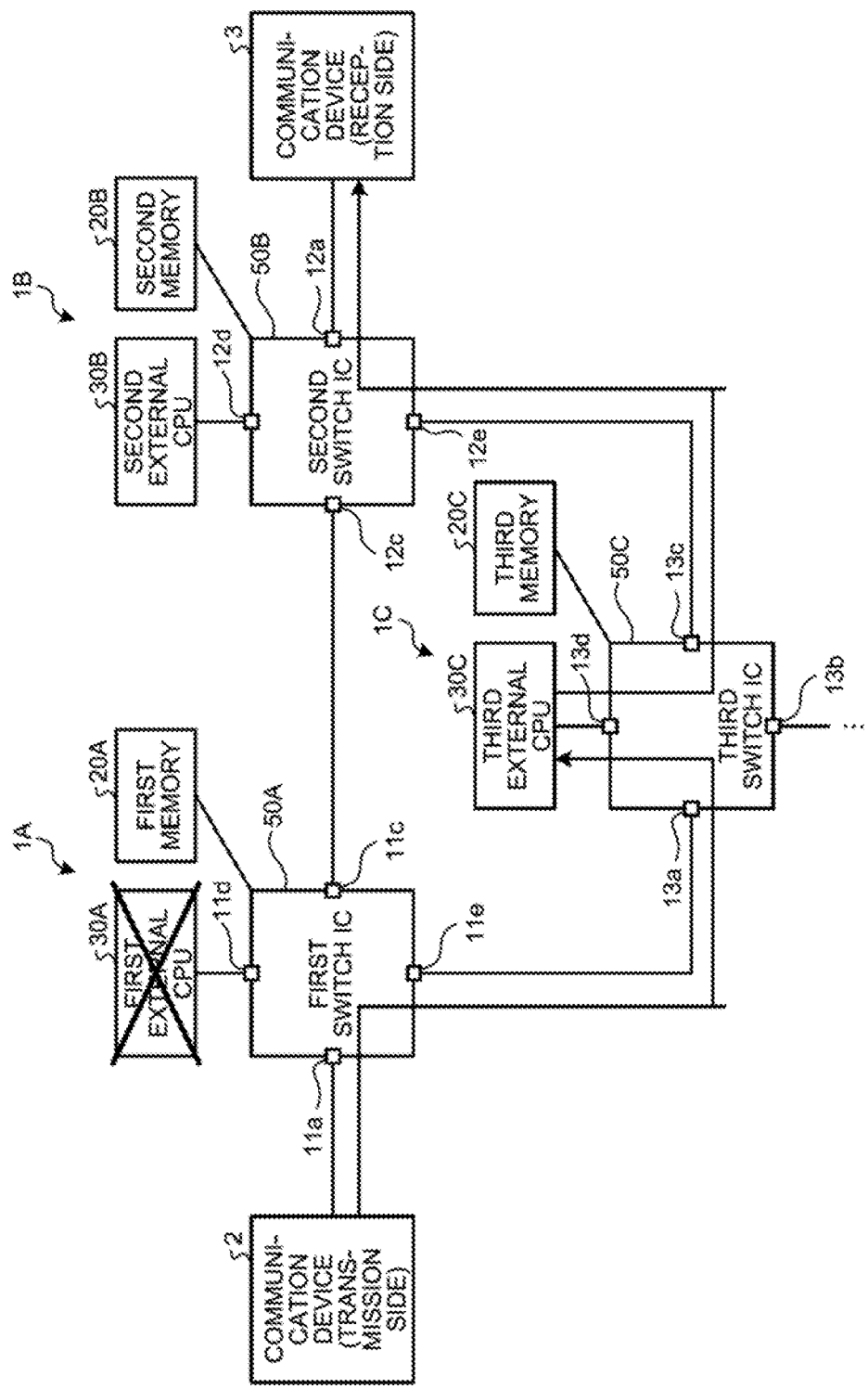
FIG. 9 is a block diagram illustrating an operation example in which the vehicle communication system according to one embodiment is abnormal (No. 2)

Next, another operation example in which the vehicle communication system 100 is abnormal is described. FIG. 9 is a block diagram illustrating an operation example in which the vehicle communication system 100 according to one embodiment is abnormal (No. 2). In the example described here, as illustrated in FIG. 9, the first external CPU 30A is abnormal in the vehicle communication system 100. In the example illustrated in FIG. 9, the security process is performed by the third switching hub 1C when the first external CPU 30A is abnormal. The selection of the switching hub 1 that performs the security process when the first external CPU 30A is abnormal may be determined in advance by the design or changed as appropriate by determining whether the communication load is high or low. For example, a middle CPU (not illustrated) monitors the communication load of the switching hubs 1, and causes the switching hub 1 with the relatively small communication load among the switching hubs 1 to perform the security process. For example, the middle CPU monitors the communication load of the second switching hub 1B and the third switching hub 1C, and if the third switching hub 1C has the smaller communication load than the second switching hub 1B in the occurrence of the abnormality in the first external CPU 30A, the middle CPU causes the third switching hub 1C to perform the security process.

The first internal CPU 51A of the first switch IC 50A illustrated in FIG. 9 outputs to the setting circuit 40, the order to prohibit the communication performed by the first external CPU 30A in the occurrence of the abnormality in the first external CPU 30A. If the order to prohibit the communication performed by the first external CPU 30A is output from the first internal CPU 51A, the setting circuit 40 sets to prohibit the communication of the port 11d.

The first internal CPU 51A performs the transfer order process instead of the first external CPU 30A. For example, the first internal CPU 51A generates the frame F2 in which the error code EC expressing that the first external CPU 30A is abnormal and operates in the safe mode is added to the field in the payload in the frame F1. Then, the first internal CPU 51A performs the transfer order process of ordering to transfer the frame F2 to the port 11e indicated by the acquired port number. The first internal CPU 51A outputs the frame F2 to be transferred to the port 11e on the basis of the transfer order that is determined by itself in the transfer order process, and transfers the frame F2 to the third switching hub 1C. In this case, the first internal CPU 51A does not perform the security process because the information processing capability is insufficient.

Since the security process is not performed in the source of the frame F2 (the first switching hub 1A), the third external CPU 30C of the third switching hub 1C performs the security process instead. For example, the third external CPU 30C compares the MAC address of the frame F2 output from the first switching hub 1A and the MAC address that is predetermined as an allowable MAC address, and if the MAC address of the frame F2 to be transferred does not coincide with the allowable MAC address, the third external CPU 30C determines that the frame F2 to be transferred is the suspicious frame F2 and discards the suspicious frame F2. On the other hand, if the MAC address of the frame F2 to be transferred coincides with the allowable MAC address, the third external CPU 30C determines that the frame F2 to be transferred is the frame F2 that is reliable and does not discard the frame F2.

If the frame F2 is a reliable frame, the third external CPU 30C performs the transfer order process of ordering to transfer the frame F2 output from the first switching hub 1A on the basis of the routing table for safe mode. The third external CPU 30C, for example, compares the MAC address included in the frame F2 and the MAC address of each device registered in the routing table for the safe mode. Then, the third external CPU 30C detects the MAC address of the second switching hub 1B that coincides with the MAC address in the frame F2, and acquires the port number associated with the MAC address of the detected second switching hub 1B. Next, the third external CPU 30C outputs to a third internal CPU (not illustrated), the transfer order signal for ordering to transfer the frame F2 to the port 13c indicated by the acquired port number. If the transfer order signal expresses that the frame F2 to be transferred is output to the port 13c, the third internal CPU outputs the frame F2 to be transferred to the port 13c and transfers the frame F2 to the second switching hub 1B (see FIG. 9).

Since the error code EC is added to the field in the payload in the frame F2, the second external CPU 30B of the second switching hub 1B operates based on the computer program for the safe mode and the routing table for the safe mode. Since the security process is already performed in the source of the frame F2 (the third switching hub 1C), the second external CPU 30B does not perform the security process.

The second external CPU 30B performs the transfer order process of ordering to transfer the frame F2 output from the first switching hub 1A on the basis of the routing table for the safe mode. The second external CPU 30B, for example, acquires the port number associated with the MAC address of the communication device 3 that coincides with the MAC address of the frame F2. Next, the second external CPU 30B outputs to the second internal CPU 51B, the transfer order signal for ordering to transfer the frame F2 to the port 12a indicated by the acquired port number. If the transfer order signal expresses that the information to be transferred is output to the port 12a, the second internal CPU 51B outputs the frame F2 to be transferred to the port 12a and transfers the frame F2 to the communication device 3 (see FIG. 9).

Next, an operation example of the vehicle communication system 100 is described with reference to the flowchart. FIG. 10 is a flowchart illustrating an operation example of the vehicle communication system 100 according to one embodiment. The vehicle communication system 100 receives information from the communication device 2 (step S1). For example, the external CPU 30 receives the frame F1 from the communication device 2. Next, the external CPU 30 performs the security process and the transfer order process (step S2). Next, an internal CPU 51 acquires the link information L of the external CPU 30 (step S3), and determines whether the external CPU 30 is normal (step S4). If the external CPU 30 is normal (Yes at step S4), the internal CPU 51 continues to permit the communication of the internal CPU 30 (step S5) and transfers the information to be transferred to the corresponding one of the ports 11a to 11e (step S6).

At step S4, if the external CPU 30 is abnormal (No at step S4), the internal CPU 51 orders the setting circuit 40 to prohibit the communication (step S7) and prohibits the communication of the external CPU 30 (step S8). The internal CPU 51 performs the transfer order process (step S9) and adds the error code EC to the payload in the frame F1 (step S10). Next, the vehicle communication system 100 changes the communication route if necessary (step S11). For example, in accordance with the communication load, the vehicle communication system 100 changes the communication route from a first communication route of communicating from the first switching hub 1A to the second switching hub 1B to a second communication route of communicating from the first switching hub 1A to the second switching hub 1B through the third switching hub 1C. Then, the vehicle communication system 100 causes a meter, a multi-display, or the like to perform the error display, thereby notifying an occupant in the vehicle of the abnormality (S12).

Thus, the vehicle communication system 100 according to the embodiment includes the switching hub 1 incorporated in the vehicle and including the switch IC 50 and the external CPU 30. The switch IC 50 includes the internal CPU 51, and performs the transfer process of transferring information to the communication device 2. The external CPU 30 is provided outside the switch IC 50, connected to the switch IC 50, and has the higher information processing capability than the internal CPU 51. The external CPU 30 can perform the transfer order process of ordering to perform the transfer process, and also can perform the security process of securing the security of the information to be transferred when the transfer order process is performed. The internal CPU 51 monitors the operation of the external CPU 30, and if the external CPU 30 is abnormal, the internal CPU 51 performs the transfer order process instead of the external CPU 30.

Here, the conventional switching hub includes a sub-CPU that functions as a backup in the occurrence of the abnormality in the external CPU 30, and as a result, the number of components has increased and the unit has increased in size. On the other hand, the switching hub 1 according to the embodiment performs the transfer order process by the internal CPU 51 in the occurrence of the abnormality in the external CPU 30; thus, it is unnecessary to have the sub-CPU for the backup and the increase in number of components and the size increase can be suppressed and at the same time, the weight can be reduced. In addition, the switching hub 1 according to the embodiment can continue the transfer order process in the occurrence of the abnormality in the external CPU 30; thus, the decrease in reliability can be suppressed. As a result, the vehicle communication system 100 can transfer information properly.

In the vehicle communication system 100, if the external CPU 30 is abnormal, the internal CPU 51 disables the function of the external CPU 30, performs the transfer order process instead of the external CPU 30, and does not perform the security process. By this structure, the switching hub 1 can continue the transfer order process in the occurrence of the abnormality in the external CPU 30 and can suppress the decrease in reliability.

The vehicle communication system 100 includes a plurality of the switching hubs 1, and the switching hubs 1 include at least the first switching hub 1A and the second switching hub 1B that transfers the information transmitted from the first switching hub 1A. If the first external CPU 30A of the first switching hub 1A is normal, the first switching hub 1A performs the security process by the own first external CPU 30A and transmits the security secured information (frame F1) for which the security has been secured to the second switching hub 1B. The second switching hub 1B transfers the security secured information (frame F1) transmitted from the first switching hub 1A without performing the security process. On the other hand, if the first external CPU 30A of the first switching hub 1A is abnormal, the first switching hub 1A transmits the security unsecured information (frame F2) for which the security information has not been performed to the second switching hub 1B. The second switching hub 1B performs, by the own second external CPU 30B, the security process for the security unsecured information (frame F2) transmitted to the first switching hub 1A, and then transfers the information. By this structure, even in the occurrence of the abnormality in the first external CPU 30A of the first switching hub 1A, the vehicle communication system 100 can perform the security process by the other second switching hub 1B; thus, the decrease in security can be suppressed.

In the aforementioned example, the external CPU 30 performs the transfer order process and the security process; however, alternatively, the external CPU 30 may perform another process, such as plug and play of automatically setting the connection device.

In the aforementioned example, the internal CPU 51 disables the function of the external CPU 30 if the external CPU 30 is abnormal; however, the function of the external CPU 30 may be disabled by a process unit other than the internal CPU 51.

In the aforementioned example, the transfer unit is the switching hub 1 that transfers the information to the particular port on the basis of the routing table; however, the transfer unit may be a hub that transfers the information to all the ports.

In the aforementioned example, the memory 20 is provided outside the switch IC 50; however, the memory 20 may be provided inside the switch IC 50.

If both the first external CPU 30A and the second external CPU 30B are abnormal and the switching hub 1 exists in the stage subsequent to the second switching hub 1B, the vehicle communication system 100 may perform the security process by the subsequent switching hub 1.

The switching hub 1, if the own external CPU 30 is abnormal, transfers the information to be transferred without the security process regardless of whether the information has been subjected to the security process, and this is because the information processing capability is insufficient.

In the vehicle communication system according to the embodiment, if the external controller is abnormal, the internal controller performs the transfer order process instead of the external controller; therefore, the information can be correctly transferred.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle communication system comprising:
    a transfer unit including
        a control circuit that includes an internal controller, is incorporated in a vehicle, is connected to a device, and performs a transfer process of transferring information to the device, and
        an external controller that is provided outside the control circuit, is connected to the control circuit, has higher information processing capability than the internal controller, is able to perform a transfer order process of ordering to perform the transfer process, and when performing the transfer order process, is able to perform a security process of securing security of the information to be transferred, wherein
    the internal controller monitors operation of the external controller, and when the external controller is abnormal, the internal controller performs the transfer order process instead of the external controller, and
    when the external controller is abnormal, the internal controller disables a function of the external controller, performs the transfer order process instead of the external controller, and does not perform the security process.

2. A vehicle communication system comprising:
    a transfer unit including
        a control circuit that includes an internal controller, is incorporated in a vehicle, is connected to a device, and performs a transfer process of transferring information to the device, and
        an external controller that is provided outside the control circuit, is connected to the control circuit, has higher information processing capability than the internal controller, is able to perform a transfer order process of ordering to perform the transfer process, and when performing the transfer order process, is able to perform a security process of securing security of the information to be transferred, wherein
    the internal controller monitors operation of the external controller, and when the external controller is abnormal, the internal controller performs the transfer order process instead of the external controller; and
    a plurality of the transfer units, wherein
    the transfer units include a first transfer unit and a second transfer unit that transfers information transmitted from the first transfer unit,
    when the external controller of the first transfer unit is normal, the first transfer unit transmits, to the second transfer unit, security secured information for which the external controller of the first transfer unit has performed the security process so that the security is secured, and the second transfer unit transfers the security secured information transmitted from the first transfer unit without performing the security process, and
    when the external controller of the first transfer unit is abnormal, the first transfer unit transmits, to the second transfer unit, security unsecured information for which the security process has not been performed, and the second transfer unit causes the external controller of the second transfer unit to perform the security process for the security unsecured information transmitted from the first transfer unit and transfers the information.

3. The vehicle communication system according to claim 1, further comprising:
    a plurality of the transfer units, wherein
    the transfer units include a first transfer unit and a second transfer unit that transfers information transmitted from the first transfer unit,
    when the external controller of the first transfer unit is normal, the first transfer unit transmits, to the second transfer unit, security secured information for which the external controller of the first transfer unit has performed the security process so that the security is secured, and the second transfer unit transfers the security secured information transmitted from the first transfer unit without performing the security process, and
    when the external controller of the first transfer unit is abnormal, the first transfer unit transmits, to the second transfer unit, security unsecured information for which the security process has not been performed, and the second transfer unit causes the external controller of the second transfer unit to perform the security process for the security unsecured information transmitted from the first transfer unit and transfers the information.

\* \* \* \* \*